United States Patent
Luo

(10) Patent No.: US 11,055,729 B2
(45) Date of Patent: Jul. 6, 2021

(54) SYSTEMS AND METHODS FOR DETERMINING A MARKETING STRATEGY FOR AN ONLINE TO OFFLINE SERVICE

(71) Applicant: BEIJING DIDI INFINITY TECHNOLOGY AND DEVELOPMENT CO., LTD., Beijing (CN)

(72) Inventor: Wenjuan Luo, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/088,534

(22) Filed: Nov. 3, 2020

(65) Prior Publication Data
US 2021/0049623 A1 Feb. 18, 2021

Related U.S. Application Data

(63) Continuation of application No. PCT/CN2018/095181, filed on Jul. 10, 2018.

(51) Int. Cl.
| | |
|---|---|
| *G06Q 30/02* | (2012.01) |
| *G06N 20/00* | (2019.01) |
| *G06F 17/18* | (2006.01) |
| *G06K 9/62* | (2006.01) |

(52) U.S. Cl.
CPC ......... *G06Q 30/0201* (2013.01); *G06F 17/18* (2013.01); *G06K 9/6297* (2013.01); *G06N 20/00* (2019.01)

(58) Field of Classification Search
CPC .... G06Q 30/0201; G06N 20/00; G06F 17/18; G06K 9/6297
See application file for complete search history.

(56) References Cited

U.S. PATENT DOCUMENTS

| | | | |
|---|---|---|---|
| 8,285,581 | B2 | 10/2012 | Abe et al. |
| 9,090,255 | B2 | 7/2015 | Gupta et al. |
| 10,558,987 | B2 * | 2/2020 | Theocharous ..... G06Q 30/0202 |
| 2010/0332315 | A1 | 12/2010 | Kamar et al. |

(Continued)

FOREIGN PATENT DOCUMENTS

CN 105930625 A 9/2016

OTHER PUBLICATIONS

International Search Report in PCT/CN2018/095181 dated Mar. 27, 2019, 4 pages.

(Continued)

*Primary Examiner* — Sujay Koneru
(74) *Attorney, Agent, or Firm* — Metis IP LLC

(57) ABSTRACT

Systems and methods for determining a marketing strategy for an online to offline service are provided. A method may include: obtaining a plurality of historical vectors, determining a first value function according to a first reinforcement learning algorithm based on the plurality of historical vectors, determining a first value under a state of a driver to provide the online to offline service based on the first value function and the plurality of historical vectors, and obtaining a first regression model by training an initial model, wherein the plurality of historical vectors are inputs of the initial model, and the first value under the state is a label of the initial model.

19 Claims, 9 Drawing Sheets

(56) References Cited

U.S. PATENT DOCUMENTS

| | | | |
|---|---|---|---|
| 2011/0282732 A1* | 11/2011 | Bax | G06Q 30/02 |
| | | | 705/14.44 |
| 2014/0180790 A1* | 6/2014 | Boal | G06Q 30/0211 |
| | | | 705/14.42 |
| 2015/0262205 A1 | 9/2015 | Theocharous et al. | |
| 2016/0225014 A1* | 8/2016 | Mitra | G06Q 30/0243 |
| 2016/0342911 A1 | 11/2016 | Kannan et al. | |
| 2017/0154314 A1* | 6/2017 | Mones | G06F 16/2462 |
| 2017/0261947 A1* | 9/2017 | Koga | B60W 40/09 |
| 2017/0300939 A1* | 10/2017 | Chittilappilly | G06N 20/00 |
| 2017/0300975 A1 | 10/2017 | Iannace et al. | |
| 2018/0012153 A1 | 1/2018 | Hu et al. | |

OTHER PUBLICATIONS

Written Opinion in PCT/CN2018/095181 dated Mar. 27, 2019, 5 pages.

* cited by examiner

500

- 510: Obtaining a plurality of historical vectors
- 520: Determining a first value function according to a first reinforcement learning algorithm based on the plurality of historical vectors
- 530: Determining a first value under a state of a driver to provide the online on-demand car service based on the first value function and the plurality of historical vectors
- 540: Obtaining a first regression model by training an initial model, wherein the plurality of historical vectors are inputs of the initial model, and the first value under the state is a label of the initial model
- 550: Determining a marketing strategy for the state based on the first regression model

Determining at least one random strategy based on a plurality of historical marketing strategies, each historical marketing strategy include a historical state of a driver, a historical action that the system implemented to the driver, and a historical long-term value under the historical state that the driver contributed to the system after being implemented to the historical action — 710

Obtaining at least one strategy distribution by sampling the at least one random strategy according to the importance sampling method — 720

Determining an estimated long-term value under each historical state that the driver will contribute to the system based on the first regression mode — 730

Determining an evaluation result based on the estimated long-term value and the historical long-term value — 740

FIG. 7

SYSTEMS AND METHODS FOR DETERMINING A MARKETING STRATEGY FOR AN ONLINE TO OFFLINE SERVICE

CROSS-REFERENCE TO THE RELATED APPLICATIONS

This application is a continuation of International Application No. PCT/CN2018/095181, filed on Jul. 10, 2018, the contents of which are hereby incorporated by reference.

TECHNICAL FIELD

The present disclosure generally relates to systems and methods for providing an online to offline service, and in particular, to systems and methods for determining a marketing strategy for the online to offline service.

BACKGROUND

Online to offline services, especially online car hailing services, have become more and more popular. After a driver registers on an online car hailing service system, the system always implements at least one marketing strategy (e.g., sending something (e.g., a short message, a coupon, a fuel coupon, etc.), a sequence of sending something (e.g., first sending a short message, and then sending a coupon), etc.) to the driver, to ensure that the driver brings in the greatest contribution to the system. A problem of the existing system is that, in some cases, the optimization of the marketing strategy has low efficiency and lacks pertinence. Therefore, some drivers are insensitive to the marketing strategy, and the system loses some drivers after they complete their first car hailing service orders. Accordingly, it is desirable to provide systems and methods for determining and optimizing a marketing strategy for an online to offline service.

SUMMARY

According to an aspect of the present disclosure, a system may include at least one computer-readable storage medium including a set of instructions for allocating orders in an online to offline service, and at least one processor in communication with the computer-readable storage medium, wherein when executing the set of instructions, the at least one processor may be directed to: obtain a plurality of historical vectors; determine a first value function according to a first reinforcement learning algorithm based on the plurality of historical vectors; determine a first value under a state of a driver to provide the online to offline service based on the first value function and the state; and obtain a first regression model by training an initial model, wherein the plurality of historical vectors are inputs of the initial model, and the first value under the state is a label of the initial model.

In some embodiments, each of the plurality of historical vectors may include the state of the driver, at least one historical action that the system implemented to the driver under the state, and a historical reward under the state and the at least one historical action.

In some embodiments, the at least one processor may be further directed to: evaluate off-line the first regression model using an importance sampling method; and thereby, adjust at least one parameter of the first reinforcement learning algorithm or the first regression model.

In some embodiments, the at least one processor may be further directed to: determine at least one random strategy based on a plurality of historical marketing strategies, wherein each historical marketing strategy includes a historical state of a driver, a historical action that the system implemented to the driver, and a historical long-term value under the state that the driver contributed to the system after being implemented to the historical action; obtain at least one strategy distribution by sampling the at least one random strategy according to the importance sampling method; determine an estimated long-term value under each historical state that the driver will contribute to the system based on the first regression model; and determine an evaluation result based on the estimated long-term value and the historical long-term value.

In some embodiments, the state of the driver may include statistical information associated with the driver in the system and/or a demographic attribute of the driver.

In some embodiments, the statistical information may include a registration time of the car, information of the car, or a lapse between the registration time and a first online to offline service provided by the car, and wherein the demographic attribute of the driver comprises age, sex, a cultural background, and a job, and any combination thereof.

In some embodiments, the at least one historical action may include at least one of: a short message, a coupon, an action time the system sent to the driver, or a sequence of a plurality of the at least one historical actions.

In some embodiments, the historical reward may include a Gross Merchandise Volume that the driver contributed to the system.

In some embodiments, the at least one strategy distribution may include an optimal strategy distribution.

In some embodiments, the first reinforcement learning algorithm may include a Q-learning algorithm, and the inputs of the Q-learning algorithm are the plurality of historical vectors, and the output of the Q-learning algorithm is the first value function.

In some embodiments, the first reinforcement learning algorithm may include a Sarsa-learning algorithm, and the inputs of the Sarsa-learning algorithm are the plurality of historical vectors, and the output of the Sarsa-learning algorithm is the first value function.

In some embodiments, the initial model may include a XG Boost model.

In some embodiments, to obtain the plurality of historical vectors, the at least one processor may be further directed to: obtain a plurality of historical vectors based on a Markov Decision Process (MDP) model, wherein the input of the MDP model is historical marketing data.

In some embodiments, the at least one processor may be further directed to: determine a second value function according to a second reinforcement learning algorithm based on the plurality of historical vectors; determine a second value under each state based on the second value function and the state; determine a second regression model by training the initial model, wherein the plurality of historical vectors are the inputs of the initial model, the second value under each state is a label of the initial model; and select a final model from the first regression model and the second regression model.

In some embodiments, to determine the final model, the at least one processor may be further directed to: determine at least one random strategy; obtain at least one strategy distribution by sampling the at least one random strategy; determine a first estimated long-term value under the state that the driver will contribute to the system based on the first regression model; determine a second estimated long-term value under the state that the driver will contribute to the system based on the second regression model; and determine the final model based on the first estimated long-term value, the second estimated long-term value, and the historical long-term value under the state.

In some embodiments, the at least one processor may be further directed to: adjust at least one parameter of the first reinforcement learning algorithm or the second reinforcement learning algorithm based on the first estimated long-term value, the second estimated long-term value, and the historical long-term value under the state.

According to another aspect of the present disclosure, a method for determining a marketing strategy for an online to offline service may be implemented on a computing device having at least one processor, at least one computer-readable storage medium, and a communication platform connected to a network. The method may include one or more following operations: obtaining a plurality of historical vectors; determining a first value function according to a first reinforcement learning algorithm based on the plurality of historical vectors; determining a first value under a state of a driver to provide the online to offline service based on the first value function and the plurality of historical vectors; and obtaining a first regression model by training an initial model, wherein the plurality of historical vectors are inputs of the initial model, and the first value under the state is the label of the initial model.

In some embodiments, each of the plurality of historical vectors may include the state of the driver, at least one historical action that the system implemented to the driver under the state, and a historical reward under the state and the at least one historical action.

In some embodiments, the method may further include one or more following operations: evaluating off-line the first regression model using an importance sampling method; and thereby, adjusting at least one parameter of the first reinforcement learning algorithm or the first regression model.

In some embodiments, the method may further include one or more following operations: determining at least one random strategy based on a plurality of historical marketing strategies, wherein each historical marketing strategy includes a historical state of a driver, a historical action that the system implemented to the driver, and a historical long-term value under the state that the driver contributed to the system after being implemented to the historical action; obtaining at least one strategy distribution by sampling the at least one random strategy according to the importance sampling method; determining an estimated long-term value under each historical state that the driver will contribute to the system based on the first regression model; and determining an evaluation result based on the estimated long-term value and the historical long-term value.

In some embodiments, the state of the driver may include statistical information associated with the driver in the system and/or a demographic attribute of the driver.

In some embodiments, the statistical information may include a registration time of the car, information of the car, or a lapse between the registration time and a first online to offline service provided by the car, and wherein the demographic attribute of the driver comprises age, sex, a cultural background, and a job, and any combination thereof.

In some embodiments, the at least one historical action may include at least one of: a short message, a coupon, an action time the system sent to the driver, or a sequence of a plurality of the at least one historical actions.

In some embodiments, the historical reward may include a Gross Merchandise Volume that the driver contributed to the system.

In some embodiments, the at least one strategy distribution may include an optimal strategy distribution.

In some embodiments, the first reinforcement learning algorithm may include a Q-learning algorithm, and the inputs of the Q-learning algorithm are the plurality of historical vectors, and the output of the Q-learning algorithm is the first value function.

In some embodiments, the first reinforcement learning algorithm may include a Sarsa-learning algorithm, and the inputs of the Sarsa-learning algorithm are the plurality of historical vectors, and the output of the Sarsa-learning algorithm is the first value function.

In some embodiments, the initial model may include a XG Boost model.

In some embodiments, the obtaining the plurality of historical vectors may include: obtaining a plurality of historical vectors based on a Markov Decision Process (MDP) model, wherein the input of the MDP model is historical marketing data.

In some embodiments, the method may further include one or more following operations: determining a second value function according to a second reinforcement learning algorithm based on the plurality of historical vectors; determining a second value under each state based on the second value function and the state; determining a second regression model by training the initial model, wherein the plurality of historical vectors are the inputs of the initial model, the second value under each state is a label of the initial model; and selecting a final model from the first regression model and the second regression model.

In some embodiments, the determining the final model may include one or more following operations: determining at least one random strategy; obtaining at least one strategy distribution by sampling the at least one random strategy; determining a first estimated long-term value under the state that the driver will contribute to the system based on the first regression model; determining a second estimated long-term value under the state that the driver will contribute to the system based on the second regression model; and determining the final model based on the first estimated long-term value, the second estimated long-term value, and the historical long-term value under the state.

In some embodiments, the method may further include one or more following operations: adjusting at least one parameter of the first reinforcement learning algorithm or the second reinforcement learning algorithm based on the first estimated long-term value, the second estimated long-term value, and the historical long-term value under the state.

According to still another aspect of the present disclosure, a system configured to determine a marketing strategy for an online to offline service may include one or more following modules: a historical vector module configured to obtain a plurality of historical vectors; a first value function module configured to determine a first value function according to a first reinforcement learning algorithm based on the state; a first value module configured to determine a first value under a state of a driver to provide the online to offline service based on the first value function and the plurality of historical vectors; and a first regression model module configured to obtain a first regression model by training an initial model, wherein the plurality of historical vectors are inputs of the initial model, and the first value under the state is a label of the initial model.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

FIG. 5 is a flowchart illustrating an exemplary process and/or method for determining a marketing strategy for an online to offline service according to some embodiments of the present disclose;

FIG. 7 is a flowchart illustrating an exemplary process and/or method for offline evaluating the first regression model according to some embodiments of the present disclose;

DETAILED DESCRIPTION

Figure 1:
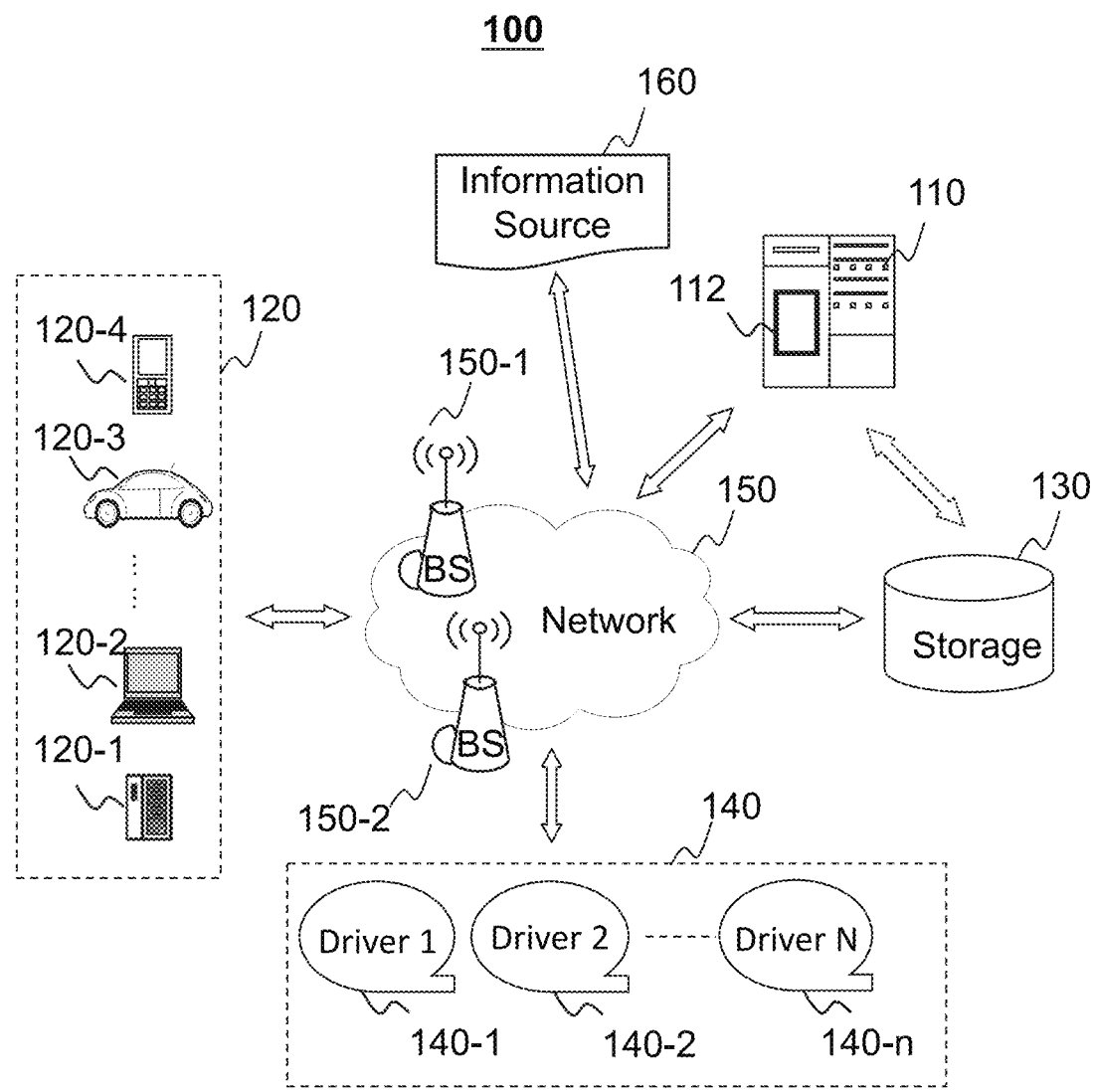
FIG. 1 is a block diagram of an exemplary system for determining a marketing strategy for an online to offline service according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the system and method in the present disclosure is described primarily in regard to online car hailing services, it should also be understood that this is only one exemplary embodiment. The system or method of the present disclosure may be applied to any other kind of online to offline service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The position and/or trace in the present disclosure may be acquired by positioning technology embedded in a user terminal (e.g., a passenger terminal, a driver terminal). The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (Wi-Fi) positioning technology, or the like, or any combination thereof. One or more of the above positioning technologies may be used interchangeably in the present disclosure.

One aspect of the present disclosure relates to online systems and methods for determining a marketing strategy for an online to offline service. According to the present disclosure, the systems and methods may train a model for determining a marketing strategy based on a reinforcement learning method and a supervised machine learning method. The systems and method may offline evaluate the model using an importance sampling method to optimize the marketing strategy. In other embodiment of the first aspect of the present disclosure further provides a system configured to determine a marketing strategy for an online to offline service, comprising:

at least one computer-readable storage medium for storing a set of instructions in determining the marketing strategy for the online to offline service; and at least one processor in communication with the computer-readable storage medium, wherein when executing the set of instructions, the at least one processor is directed to:
obtain a plurality of historical vectors;
determine a first value function according to a first reinforcement learning algorithm based on the plurality of historical vectors;
determine a first value under a state of a driver to provide the online to offline service based on the first value function and the plurality of historical vectors; and
obtain a first regression model by training an initial model, wherein the plurality of historical vectors are inputs of the initial model, and the first value under the state is a label of the initial model.

Wherein each of the plurality of historical vectors includes the state of the driver, at least one historical action that the system implemented to the driver under the state, and a historical reward under the state and the at least one historical action.

Any of the proceeding systems, wherein the at least one processor is further directed to:
evaluate off-line the first regression model using an importance sampling method; and thereby,
adjust at least one parameter of the first reinforcement learning algorithm or the first regression model.

Any of the proceeding systems, wherein the at least one processor is further directed to:
determine at least one random strategy based on a plurality of historical marketing strategies, wherein each historical marketing strategy includes a historical state of a driver, a historical action that the system implemented to the driver, and a historical long-term value under the state that the driver contributed to the system after being implemented to the historical action;
obtain at least one strategy distribution by sampling the at least one random strategy according to the importance sampling method;
determine an estimated long-term value under each historical state that the driver will contribute to the system based on the first regression model; and
determine an evaluation result based on the estimated long-term value and the historical long-term value.

Any of the proceeding systems, wherein the state of the driver comprises statistical information associated with the driver in the system and/or a demographic attribute of the driver.

Wherein the statistical information comprises at least one of: a registration time of the car, information of the car, or a lapse between the registration time and a first online to offline service provided by the car, and wherein the demographic attribute of the driver comprises age, sex, a cultural background, and a job, and any combination thereof.

Any of the proceeding systems, wherein the at least one historical action comprises at least one of: a short message, a coupon, an action time the system sent to the driver, or a sequence of a plurality of the at least one historical actions.

Any of the proceeding systems, wherein the historical reward comprises a Gross Merchandise Volume that the driver contributed to the system, and wherein the at least one strategy distribution comprises an optimal strategy distribution.

Any of the proceeding systems, wherein the first reinforcement learning algorithm includes a Q-learning algorithm, and the inputs of the Q-learning algorithm are the plurality of historical vectors, and the output of the Q-learning algorithm is the first value function.

Any of the proceeding systems, wherein the first reinforcement learning algorithm includes a Sarsa-learning algorithm, and the inputs of the Sarsa-learning algorithm are the plurality of historical vectors, and the output of the Sarsa-learning algorithm is the first value function.

Any of the proceeding systems, wherein the initial model is a XG Boost model.

Any of the proceeding systems, wherein to obtain the plurality of historical vectors, the at least one processor is further directed to:
obtain a plurality of historical vectors based on a Markov Decision Process (MDP) model, wherein the input of the MDP model is historical marketing data.

Any of the proceeding systems, wherein the at least one processor is further directed to:
determine a second value function according to a second reinforcement learning algorithm based on the plurality of historical vectors;
determine a second value under each state based on the second value function and the plurality of historical vectors;
determine a second regression model by training the initial model, wherein the plurality of historical vectors are the inputs of the initial model, the second value under each state is the label of the initial model; and
select a final model from the first regression model and the second regression model.

Wherein to determine the final model, the at least one processor is further directed to:
determine at least one random strategy;
obtain at least one strategy distribution by sampling the at least one random strategy;
determine a first estimated long-term value under the state that the driver will contribute to the system based on the first regression model;
determine a second estimated long-term value under the state that the driver will contribute to the system based on the second regression model; and
determine the final model based on the first estimated long-term value, the second estimated long-term value, and the historical long-term value under the state.

Any of the proceeding systems, wherein the at least one processor is further directed to:
adjust at least one parameter of the first reinforcement learning algorithm or the second reinforcement learning algorithm based on the first estimated long-term value, the second estimated long-term value, and the historical long-term value under the state.

In other embodiment of the second aspect of the present disclosure further provides a method for determining a marketing strategy for an online to offline service implemented on a computing device having at least one processor, at least one computer-readable storage medium, and a communication platform connected to a network, comprising:
obtaining a plurality of historical vectors;
determining a first value function according to a first reinforcement learning algorithm based on the plurality of historical vectors;
determining a first value under a state of a driver to provide the online to offline service based on the first value function and the plurality of historical vectors; and
obtaining a first regression model by training an initial model, wherein the plurality of historical vectors are inputs of the initial model, and the first value under the state is a label of the initial model.

Wherein each of the plurality of historical vectors includes the state of the driver, at least one historical action that the system implemented to the driver under the state, and a historical reward under the state and the at least one historical action.

Any of the proceeding methods, further comprises:
evaluating off-line the first regression model using an importance sampling method; and thereby,
adjusting at least one parameter of the first reinforcement learning algorithm or the first regression model.

Any of the proceeding methods, further comprises:
determining at least one random strategy based on a plurality of historical marketing strategies, wherein each historical marketing strategy includes a historical state of a driver, a historical action that the system implemented to the driver, and a historical long-term value under the state that the driver contributed to the system after being implemented to the historical action;
obtaining at least one strategy distribution by sampling the at least one random strategy according to the importance sampling method;
determining an estimated long-term value under each historical state that the driver will contribute to the system based on the first regression model; and
determining an evaluation result based on the estimated long-term value and the historical long-term value.

Any of the proceeding methods, wherein the state of the driver comprises statistical information associated with the driver in the system and/or a demographic attribute of the driver.

Wherein the statistical information comprises at least one of: a registration time of the car, information of the car, or a lapse between the registration time and a first online to offline service provided by the car, and wherein the demographic attribute of the driver comprises age, sex, a cultural background, and a job, and any combination thereof.

Any of the proceeding methods, wherein the at least one historical action comprises at least one of: a short message, a coupon, an action time the system sent to the driver, or a sequence of a plurality of the at least one historical actions.

Any of the proceeding methods, wherein the historical reward comprises a Gross Merchandise Volume that the driver contributed to the system, and wherein the at least one strategy distribution comprises an optimal strategy distribution.

Any of the proceeding methods, wherein the first reinforcement learning algorithm includes a Q-learning algorithm, and the inputs of the Q-learning algorithm are the plurality of historical vectors, and the output of the Q-learning algorithm is the first value function.

Any of the proceeding methods, wherein the first reinforcement learning algorithm includes a Sarsa-learning algorithm, and the inputs of the Sarsa-learning algorithm are the plurality of historical vectors, and the output of the Sarsa-learning algorithm is the first value function.

Any of the proceeding methods, wherein the initial model is a XG Boost model.

Any of the proceeding methods, wherein the obtaining the plurality of historical vectors includes:
obtaining a plurality of historical vectors based on a Markov Decision Process (MDP) model, wherein the input of the MDP model is historical marketing data.

Any of the proceeding methods, further comprising:
determining a second value function according to a second reinforcement learning algorithm based on the plurality of historical vectors;
determining a second value under each state based on the second value function and the plurality of historical vectors;
determining a second regression model by training the initial model, wherein the plurality of historical vectors are the inputs of the initial model, the second value under each state is the label of the initial model; and
selecting a final model from the first regression model and the second regression model.

Any of the proceeding methods, wherein the determining the final model includes:
determining at least one random strategy;
obtaining at least one strategy distribution by sampling the at least one random strategy;
determining a first estimated long-term value under the state that the driver will contribute to the system based on the first regression model;
determining a second estimated long-term value under the state that the driver will contribute to the system based on the second regression model; and determining the final model based on the first estimated long-term value, the second estimated long-term value, and the historical long-term value under the state.

Any of the proceeding methods, further comprising:
adjusting at least one parameter of the first reinforcement learning algorithm or the second reinforcement learning algorithm based on the first estimated long-term value, the second estimated long-term value, and the historical long-term value under the state.

In other embodiment of the first aspect of the present disclosure further provides a system configured to determine a marketing strategy for an online to offline service, comprising:
a historical vector module configured to obtain a plurality of historical vectors;
a first value function module configured to determine a first value function according to a first reinforcement learning algorithm based on the plurality of historical vectors;
a first value module configured to determine a first value under a state of a driver to provide the online to offline service based on the first value function and the plurality of historical vectors; and
a first regression model module configured to obtain a first regression model by training an initial model, wherein the plurality of historical vectors are inputs of the initial model, and the first value under the state is a label of the initial model.

The system further comprising:
an evaluation module configured to evaluate off-line the first regression model using an importance sampling method; and
a feedback module configured to thereby adjust at least one parameter of the first reinforcement learning algorithm or the first regression model.

Any of the proceeding systems, further comprising:
a second value function module configured to determine a second value function according to a second reinforcement learning algorithm based on the plurality of historical vectors;
a second value module configured to determine a second value under each state based on the second value function and the plurality f historical vectors;
a second regression model module configured to determine a second regression model by training the initial model, wherein the plurality of historical vectors are the inputs of the initial model, the second value under each state is the label of the initial model; and
a final model module configured to select a final model from the first regression model and the second regression model.

Any of the proceeding systems, wherein the first reinforcement learning algorithm includes a Q-learning algorithm, and the inputs of the Q-learning algorithm are the plurality of historical vectors, and the output of the Q-learning algorithm is the first value function.

Any of the proceeding systems, wherein the first reinforcement learning algorithm includes a Sarsa-learning algorithm, and the inputs of the Sarsa-learning algorithm are the plurality of historical vectors, and the output of the Sarsa-learning algorithm is the first value function.

FIG. 1 is a block diagram of an exemplary system for determining a marketing strategy for an online to offline service according to some embodiments of the present disclosure. For example, the system 100 may be an online transportation service platform for transportation services such as car hailing services, chauffeur services, vehicle delivery services, carpooling services, bus services, driver hiring services, and shuttle services, etc. The system 100 may include a server 110, a passenger terminal 120, a storage 130, a driver terminal 140, a network 150 and an information source 160. The server 110 may include a processing engine 112.

The server 110 may be configured to process information and/or data relating to marketing. For example, the server 110 may implement a marketing strategy to the passenger terminal 120 and/or the driver terminal 140. As another example, the server 110 may receive information relating to a driver (e.g., register information) from the driver terminals 140, determine a marketing strategy for the driver, and implement the marketing strategy to the driver terminal 140. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the passenger terminal 120, the driver terminal 140 and/or the storage 130 via the network 150. As another example, the server 110 may be directly connected to the passenger terminal 120, the driver terminal 140 and/or the storage 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to marketing to perform one or more functions described in the present disclosure. For example, the processing engine 112 may implement a marketing strategy to the passenger terminal 120 and/or the driver terminal 140. As another example, the processing engine 112 may receive information relating to a driver (e.g., register information) from the driver terminals 140, determine a marketing strategy for the driver, and implement the marketing strategy to the driver terminal 140. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing engine 112 may include a logic circuit. The logic circuit may receive and/or send electronic signals to perform one or more functions described in the present disclosure.

In some embodiments, the passenger terminal 120 and/or the driver terminal 140 may be an individual, a tool or other entity. A passenger may be a service requester. In the present disclosure, "service requester", "passenger terminal" and "passenger" may be used interchangeably. A driver may be a service provider. In the present disclosure, "driver," "driver terminal", and "service provider" may be used interchangeably. In some embodiments, the passenger terminal 120 may include a mobile device 120-1, a tablet computer 120-2, a laptop computer 120-3, and a built-in device 120-4 in a motor vehicle, or the like, or any combination thereof. In some embodiments, the mobile device 120-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device in the motor vehicle 120-4 may include an onboard computer, an onboard television, etc. In some embodiments, the passenger terminal 120 may be a device with positioning technology for locating the position of the user and/or the passenger terminal 120.

In some embodiments, the driver terminal 140 may be similar to, or the same device as the passenger terminal 120. In some embodiments, the driver terminal 140 may be a device with positioning technology for locating the position of the driver and/or the driver terminal 140. In some embodiments, the passenger terminal 120 and/or the driver terminal 140 may communicate with another positioning device to determine the position of the user, the passenger terminal 120, the driver, and/or the driver terminal 140. In some embodiments, the passenger terminal 120 and/or the driver terminal 140 may transmit positioning information to the server 110.

The storage 130 may store data and/or instructions related to marketing. In some embodiments, the storage 130 may store data obtained/acquired from the passenger terminal 120 and/or the driver terminal 140. In some embodiments, the storage 130 may store data and/or instructions that the server 110 may execute or use to perform exemplary methods described in the present disclosure. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 130 may be connected to the network 150 to communicate with one or more components in the system 100 (e.g., the server 110, the passenger terminal 120, the driver terminal 140). One or more components in the system 100 may access the data or instructions stored in the storage 130 via the network 150. In some embodiments, the storage 130 may be directly connected to or communicate with one or more components in the system 100 (e.g., the server 110, the passenger terminal 120, the driver terminal 140, etc.). In some embodiments, the storage 130 may be part of the server 110.

The network 150 may facilitate exchange of information and/or data. In some embodiments, one or more components in the system 100 (e.g., the server 110, the passenger terminal 120, the storage 130, and the driver terminal 140) may send and/or receive information and/or data to/from other component(s) in the system 100 via the network 150. For example, the server 110 may obtain/acquire information (e.g., registration information, demographic attributes, etc.) from the passenger terminals 120 and/or the driver terminal 140 via the network 150. As another example, the server 110 may implement marketing strategy (e.g., sending short messages, coupons, etc.) to the passenger terminal 120 and/or the driver terminal 140 via the network 150. In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the system 100 may include one or more network access points. For example, the system 110 may include wired or wireless network access points such as base stations and/or wireless access points 150-1, 150-2, . . . , through which one or more components of the system 100 may be connected to the network 150 to exchange data and/or information.

The information source 160 may be a source configured to provide other information for the system 100. The information source 160 may provide the system 100 with service information, such as weather conditions, traffic information, information of laws and regulations, news events, life information, life guide information, or the like. The information source 160 may be implemented in a single central server, multiple servers connected via a communication link, or multiple personal devices. When the information source 160 is implemented in multiple personal devices, the personal devices can generate content (e.g., as referred to as the "user-generated content"), for example, by uploading text, voice, image and video to a cloud server. An information source may be generated by the multiple personal devices and the cloud server.

Figure 2:
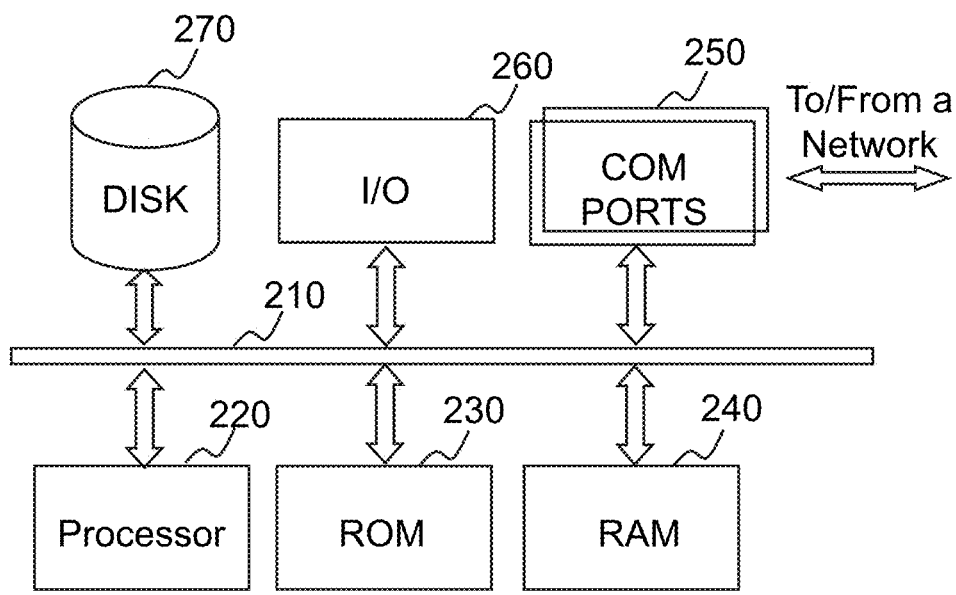
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, the passenger terminal 120, the storage 130, the driver terminal 140 and/or the information source 160 may be implemented according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the system 100 as described herein. In FIGS. 1-2, only one such computer device is shown purely for convenience purposes. One of ordinary skill in the art would understood that at the time of filing of this application that the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
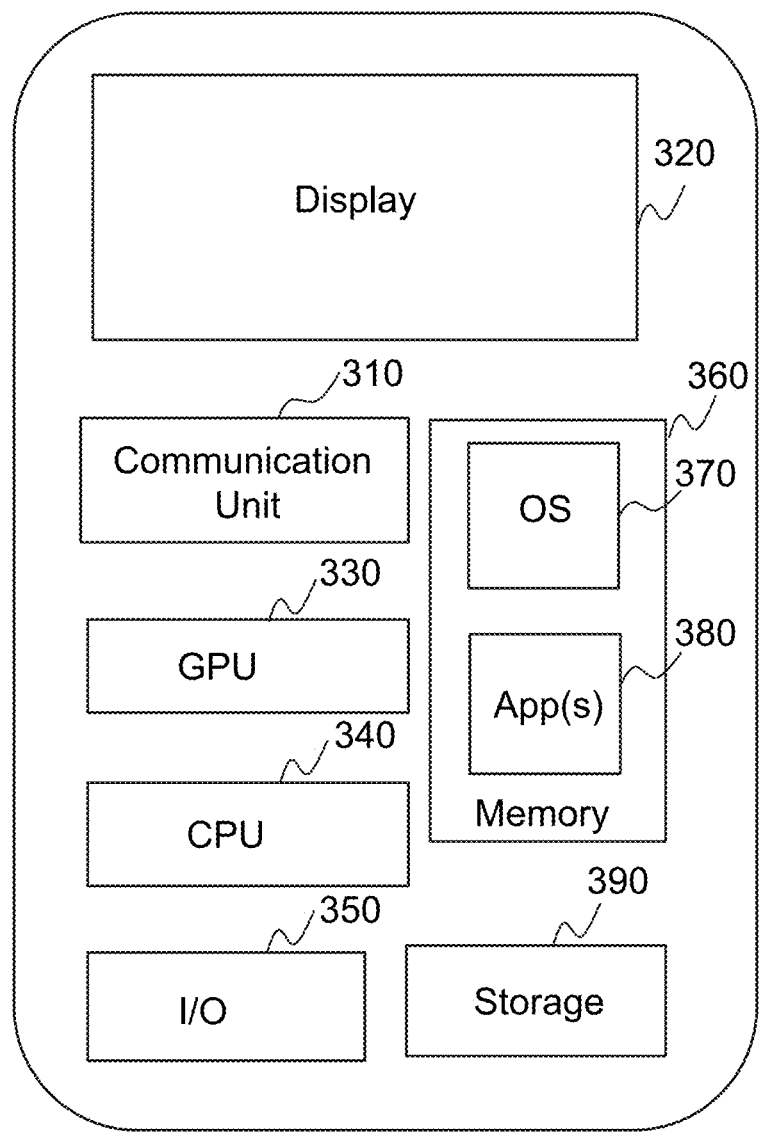
FIG. 3 is schematic diagram illustrating exemplary hardware and/or software components of a mobile device according to some embodiments of the present disclosure.

FIG. 3 is a schematic diagram illustrating exemplary hardware and/or software components of an exemplary mobile device on which the passenger terminal 120 or the provider terminal 140 may be implemented according to some embodiments of the present disclosure. As illustrated in FIG. 3, the mobile device 300 may include a communication unit 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, ANDROID™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to a service request or other information from the location based service providing system on the mobile device 300. User interactions with the information stream may be achieved via the I/O devices 350 and provided to the processing engine 112 and/or other components of the system 100 via the network 120.

In order to implement various modules, units and their functions described above, a computer hardware platform may be used as hardware platforms of one or more elements (e.g., a module of the sever 110 described in FIG. 2). Since these hardware elements, operating systems, and program languages are common, it may be assumed that persons skilled in the art may be familiar with these techniques and they may be able to provide information required in the route planning according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4:
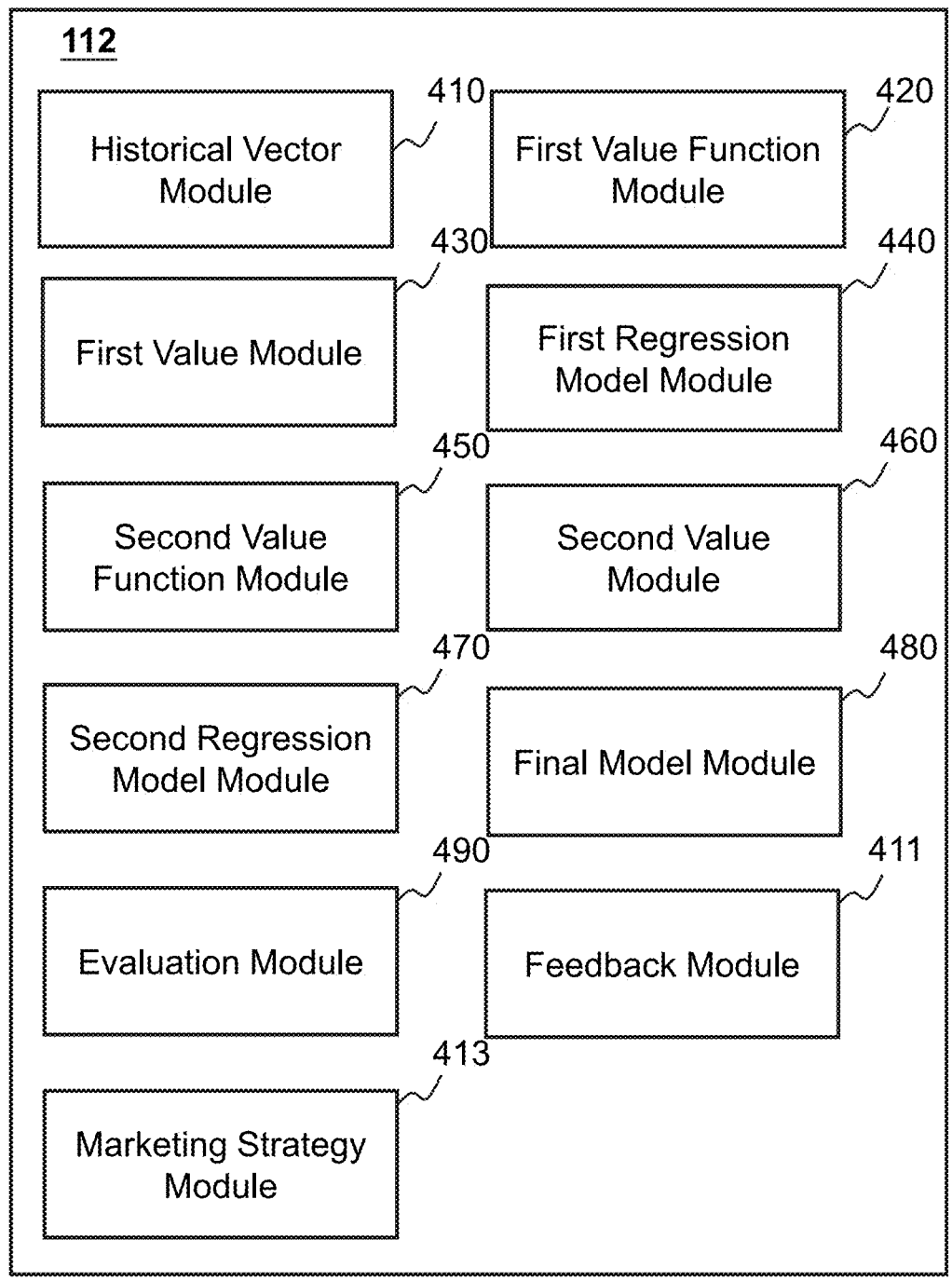
FIG. 4 is a block diagram illustrating an exemplary processing engine according to some embodiments of the present disclosure.

FIG. 4 is a block diagram illustrating an exemplary processing engine 112 according to some embodiments of the present invention. The processing engine 112 may include a historical vector module 410, a first value function module 420, a first value module 430, a first regression model module 440, a second value function module 450, a second value module 460, a second regression model module 470, a final model module 480, an evaluation module 490, a feedback module 411, and a marketing strategy module 413. Each, part, or all of the modules may be hardware circuits of all or part of the processing engine 112. Each, part, or all of the modules may also be implemented as an application or a set of instructions read and executed by the processing engine 112. Further, the modules may be any combination of the hardware circuits and the application/instructions. For example, the modules may be the part of the processing engine 112 when the processing engine is executing the application/set of instructions.

The historical vector module 410 may be configured to obtain a plurality of historical vectors. In some embodiments, each historical vector may include a set of historical information associated with historical marketing strategies during a period of time. For example, each historical vector may include a state of a driver to provide the online to offline service, at least one historical action that the system 100 implemented to the driver under the state, a historical reward that the driver contributed to the system 100 during the period of time under the state and the at least one historical action, or the like, or any combination thereof.

The first value function module 420 may be configured to determine a first value function. In some embodiments, the first value function may refer to a function that represents an expectation value of an accumulated revenue that a driver may bring in for the system 100 in the future. In some embodiments, the first value function module 420 may determine the first value function according to a first reinforcement learning algorithm based on the plurality of historical vectors obtained by the historical vector module 410.

The first value module 430 may be configured to determine a first value under a state of a driver to provide the online to offline service. In some embodiments, the first value may refer to an expectation value of an accumulated revenue that the driver may bring in for the system 100 in the future (e.g., in a predetermined time period in the future). In some embodiments, the first value module 430 may determine the first value based on the first value function and the plurality of historical vectors.

The first regression model module 440 may be configured to obtain a first regression model. In some embodiments, the first regression model may refer to a method that predicts at least one long-term value that the driver under the state may bring in for the system 100. In some embodiments, the first regression model module 440 may obtain the first regression model by training an initial model.

The second value function module 450 may be configured to determine a second value function. In some embodiments, the second value function may refer to a function that represents an expectation value of an accumulated revenue that a driver may bring in for the system 100 in the future. In some embodiments, the second value function module 450 may determine the second value function according to a second reinforcement learning algorithm based on the plurality of historical vectors.

The second value module 460 may be configured to determine a second value under a state of a driver to provide the online to offline service. In some embodiments, the second value may refer to an expectation value of an accumulated revenue that the driver may bring in for the system 100 in the future (e.g., in a predetermined time period in the future). In some embodiments, the second value module 460 may determine the second value based on the second value function and the plurality of historical vectors.

The second regression model module 470 may be configured to obtain a second regression model. In some embodiments, the second regression model may refer to a method that predicts at least one long-term value that the driver under the state may bring in for the system 100. In some embodiments, the second regression model module 470 may obtain the second regression model by training the initial model.

The final model module 480 may be configured to determine a final model. For example, the final model module 480 may be configured to select the final model from the first regression model and the second regression model. In some embodiments, the final model may refer to a method that predicts at least one long-term value that the driver under the state may bring in for the system 100.

The evaluation module 490 may be configured to evaluate a model. In some embodiments, the evaluation module 490 may be configured to evaluate the first regression model and/or the second regression model according to an importance sampling method. For example, the evaluation module 490 may be configured to determine at least one random strategy based on a plurality of historical marketing strategies; obtain at least one strategy distribution by sampling the at least one random strategy according to the importance sampling method; determine an estimated long-term value under each historical state that the driver will contribute to the system 100 based on the first regression model; and determine an evaluation result based on the estimated long-term value and the historical long-term value. As another example, the evaluation module 490 may be configured to determine at least one random strategy; obtain at least one strategy distribution by sampling the at least one random strategy according to the importance sampling method; determine a first estimated long-term value under each historical state that the driver will contribute to the system 100 based on the first regression model; and determine a second estimated long-term value under each historical state that the driver will contribute to the system 100 based on the second regression model.

The feedback module 411 may be configured to adjust at least one parameter during learning and/or training process. For example, the feedback module 411 may be configured to adjust at least one parameter of the first reinforcement learning algorithm, the first regression model, the second reinforcement learning algorithm, the second regression model, or the like, or any combination thereof.

The marketing strategy model 413 may be configured to determine a marketing strategy for a state. In some embodiments, the marketing strategy model 413 may determine the marketing strategy for the state based on a model (e.g., the first regression model, the second regression model, etc.).

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. Two or more of the modules may be combined as a single module, and any one of the modules may be divided into two or more units. For example, the first value function module 420 may be integrated in the second value function module 450 as a single module that may both determine the first value function and the second value function. As another example, the evaluation module 490 may be divided into two units: a first evaluation unit and a second evaluation unit, which work together to implement the functions of the evaluation module 490, respectively.

FIG. 5 is a flowchart of an exemplary process and/or method for determining a marketing strategy for an online to offline service according to some embodiments of the present disclose. In some embodiments, one or more steps in the process 500 may be implemented in the system 100 illustrated in FIG. 1. For example, one or more steps in the process 500 may be stored in the storage (e.g., the storage 130, the ROM 230, the RAM 240, etc.) as a form of instructions, and invoked and/or executed by the server 110 (e.g., the processing engine 112 in the server 110, or the processor 220 of the processing engine 112 in the server 110).

In 510, the processor 220 (or the historical vector module 410) may obtain a plurality of historical vectors.

In some embodiments, the processor 220 may obtain the plurality of historical vectors according to a Markov Decision Process (MDP) model. For example, the processor 220 may input historical marketing data into the MDP model, and the outputs may include the plurality of historical vectors. As another example, the processor 220 may extract at least one feature from the historical marketing data to input the at least one feature into the MDP model. The output of the MDP model may include the plurality of historical vectors. The at least one feature may include a state of a driver, an action that the system 100 implemented to the driver under the state, a current reward that the driver contributed to the system 100, or the like, or any combination thereof. In some embodiments, the MDP model may be predetermined (after training) and stored in a storage device (e.g., the storage 130, the ROM 230, the RAM 240, etc.). For example, the processor 220 may obtain the MDP model from the storage 130 to determine the plurality of historical vectors. In some embodiments, the processor 220 may use historical data in the system 100 to train and obtain a MDP model.

In some embodiments, each historical vector may include a set of historical information associated with historical marketing strategies during a period of time. For example, each historical vector may include a state of a driver to provide the online to offline service, at least one historical action that the system 100 implemented to the driver under the state, a historical reward that the driver contributed to the system 100 during the period of time under the state and the at least one historical action, or the like, or any combination thereof. In some embodiments, the plurality of historical vectors may be consecutive in the timeline.

In some embodiments, the state of the driver may refer to a status that the driver represents. For example, the state of the driver may include statistical information associated with the driver in the system 100, a demographic attribute of the driver, or the like, or any combination thereof. In some embodiments, the statistical information associated with the driver may include a registration time of the car in the system 100 (e.g., when did the car registered in the system 100, how long does the driver registered in the system 100, etc.), information of the car (e.g., the car type, a business type of the car, a license plate number of the car, etc.), a lapse between the registration time and a first online to offline service provided by the car, total time that the driver was waiting online, or the like, or any combination thereof. In some embodiments, the demographic attribute of the driver may refer to a demographic characteristic of the driver. For example, the demographic attribute may include age of the driver, sex of the driver, a cultural background of the driver, a job of the driver, or the like, or any combination thereof.

In some embodiments, the at least one historical action may refer to one or more action that the system 100 took to the driver after the driver registering in the system 100. For example, the at least one historical action may include a short message, a coupon (e.g., a coupon type, a value of the coupon, etc.), an historical action time that the system 100 sent to the driver, a sequence of a plurality of the at least one historical action, or the like, or any combination thereof. In some embodiments, the short message may be configured to inform and/or teach the driver something. In some embodiments, the coupon type may include a fuel coupon, a parking coupon, a reward coupon, or the like, or any combination thereof. In some embodiments, the sequence of a plurality of the at least one historical action may refer to a sequential order of the plurality of the at least one historical action that the system 100 took to the driver, for example, the sequence may include a sequence of first sending a short message, and then sending a fuel coupon to the driver.

In some embodiments, the historical reward may refer to how much the driver contributed to the system 100 under the state after the system 100 implemented the at least one historical action to the driver during a predetermined period of time. For example, the historical reward may include a Gross Merchandise Volume (GMV) that the driver contributed to the system 100 under the state and after being sent to the at least one action during a month. As another example, the historical reward may include a GMV that the driver contributed to the system 100 during a month after the driver completed a first car service. The predetermined period of time may be a preset time value stored in a storage (e.g., the storage 130, the ROM 230, the RAM 240, etc.) of the system 100, or may be determined according to different application scenarios (e.g., different states of drivers, different service types, etc.).

In 520, the processor 220 (or the first value function module 420) may determine a first value function according to a first reinforcement learning algorithm based on the plurality of historical vectors.

In some embodiments, the first value function may refer to a function that represents an expectation value of an accumulated revenue that a driver may bring in for the system 100 in the future. In some embodiments, the first value function may include an algorithm, a formula, a method, a process, or the like, for determining the expectation value of an accumulated revenue that a driver may bring in for the system 100. In some embodiments, the processor 220 may off-line determine the first value function according to the first reinforcement learning algorithm. In some embodiments, the processor 220 may also on-line determine the first value function.

In some embodiments, the first reinforcement learning algorithm may include a temporal-difference (TD) learning algorithm, a dynamic programming algorithm, a Monte Carlo (MC) learning algorithm, a Q-learning algorithm, a Sarsa-learning algorithm, a deep Q network algorithm, a deep deterministic policy gradient (DDPG) algorithm, or the like, or any combination thereof. In some embodiments, the processor 220 may determine the first value function according to the first reinforcement learning algorithm using a toolkit. For example, the first value function may be determined by a Spark Mllib, a MLbox, a MR, or the like, or any combination thereof.

In some embodiments, the processor 220 may input part or all of the plurality of historical vectors into the first reinforcement learning algorithm to obtain the first value function. For illustration purpose, the Q-learning algorithm and the Sarsa-learning algorithm are described herein as examples to determine the first value function. For example, the processor 220 may input the plurality of historical vectors into a Q-learning iteration Formula (1):

$$Q^{k+1}(s_t, a_t) = Q^k(s_t, a_t) + a(r_{t+1} + \gamma \max_{a'} Q^k(s_{t+1}, a') - Q^k(s_t, a_t)) \quad (1)$$

wherein $Q^{k+1}(s_t, a_t)$ denotes an expectation value of an accumulated revenue that a driver may bring in under the state $s_t$ after being implemented to the action $a_t$ in the k+1th iteration; $Q^k(s_t, a_t)$ denotes an expectation value of an accumulated revenue that the driver may bring in under the state $s_t$ after being implemented to the action $a_t$ in the kth iteration; a denotes a weight coefficient; $r_{t+1}$ denotes an immediate reward of the driver at the time t+1; $\gamma$ denotes a discount coefficient; and $\max_{a'} Q^k(s_{t+1}, a')$ denotes a maximum revenue that that the driver may bring in under the state $s_{t+1}$.

In some embodiments, the processor 220 may input the plurality of historical vectors into the Q-learning iteration Formula (1) to determine the first value function after a plurality of iterations.

As another example, the processor 220 may input the plurality of historical vectors into a Sarsa-learning iteration Formula (2):

$$Q^{k+1}(s_t, a_t) = Q^k(s_t, a_t) + a(r_{t+1} + \gamma Q^k(s_{t+1}, a_{t+1}) - Q^k(s_t, a_t)) \quad (2)$$

wherein $Q^{k+1}(s_t, a_t)$ denotes an expectation value of an accumulated revenue that a driver may bring in under the state $s_t$ after being implemented to the action $a_t$ in the k+1th iteration; $Q^k(s_t, a_t)$ denotes an expectation value of an accumulated revenue that the driver may bring in under the state $s_t$ after being implemented to the action $a_t$ in the kth iteration; a denotes a weight coefficient; $r_{t+1}$ denotes an immediate reward of the driver at the time t+1; $\gamma$ denotes a discount coefficient; and $Q^k(s_{t+1}, a_{t+1})$ denotes an expectation value of an accumulated revenue that the driver may bring in under the state $s_{t+1}$ after being implemented to the action $a_{t+1}$ in the kth iteration.

In some embodiments, the processor 220 may input the plurality of historical vectors into the Sarsa-learning iteration Formula (2) to determine the first value function after a plurality of iterations. It should be noted that the weight coefficient a and the discount coefficient $\gamma$ in different reinforcement learning algorithm (e.g., the Q-learning iteration Formula (1), the Sarsa-learning iteration Formula (2)) may be different, respectively.

In 530, the processor 220 (or the first value module 430) may determine a first value under a state of a driver to provide the online to offline service based on the first value function and the plurality of historical vectors.

In some embodiments, the first value may refer to an expectation value of an accumulated revenue that the driver may bring in for the system 100 in the future (e.g., in a predetermined time period in the future). In some embodiments, the processor 220 may traverse each state in the plurality of historical vectors to determine the corresponding first value under each state by inputting the plurality of historical vectors into the first value function.

In 540, the processor 220 (or the first regression model module 440) may obtain a first regression model by training an initial model.

In some embodiments, the first regression model may refer to a method that predicts at least one long-term value that the driver under the state may bring in for the system 100. Each long-term value may refer to a value of an accumulated revenue that the driver may bring in for the system 100 in a predetermined period of time in the future after the system 100 implementing an action to the driver under the state. The predetermined period of time may be a preset time value stored in a storage (e.g., the storage 130, the ROM 230, the RAM 240, etc.) of the system 100, or may be determined according to different application scenarios (e.g., different states of drivers, different service types, etc.).

In some embodiments, the processor 220 may input the plurality of historical vectors into the initial model. The first value under each state may be a label of the initial model. The processor 220 may train the initial model based on the inputs and the label, and the output of the initial model may be the first regression model. In some embodiments, the processor 220 may obtain the first regression model by off-line training the initial model. In some embodiments, the processor 220 may obtain the first regression model by on-line training the initial model.

In some embodiments, the processor 220 may obtain the first regression model according to a machine learning algorithm. In some embodiments, the machine learning algorithm may include a decision tree algorithm, a random forest algorithm, a logistic regression algorithm, a support vector machine algorithm, a boost (e.g., a XG boost algorithm, an Ada boost algorithm, etc.) algorithm, a k nearest neighbors algorithm, a k means algorithm, a neural network, or the like, or any combination thereof. For example, the initial model may include a XG boost model.

In some embodiments, the initial model may be predetermined and stored in a storage device (e.g., the storage 130, the ROM 230, the RAM 240, etc.). For example, the processor 220 may obtain the initial model from the storage 130 to obtain a first regression model by training the initial model. In some embodiments, the initial model may include a plurality of predetermined parameters. The predetermined parameters may be predetermined and stored in a storage device (e.g., the storage 130, the ROM 230, the RAM 240, etc.), or determined by the processor 220 in the last training and/or learning process.

In 550, the processor 220 (or the marketing strategy module 413) may determine a marketing strategy for the state based on the first regression model.

In some embodiments, the processor 220 may input the state into the first regression model. The first regression model may traverse every action that the system 100 may implement to the driver under the state, and calculate a long-term value under corresponding every action. The output of the first regression model may be an optimal action that has a greatest long-term value under the state.

In some embodiments, the processor 220 may generate the marketing strategy for the state based on the optimal action that has a greatest long-term value under the state. For example, for a driver under the state of registering on the system 100 for 7 days, the processor 220 may input the state into the first regression model to determine the optimal action (e.g., sending a parking coupon) under the state. The processor 220 may then generate a marketing strategy for sending a parking coupon to the driver under the state. In some embodiments, the marketing strategy may be same as or different from the historical marketing strategy.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 500. As another example, all the steps in the exemplary process/method 500 may be implemented in a computer-readable medium including a set of instructions. The instructions may be transmitted in a form of electronic current or electrical signals.

Figure 6:
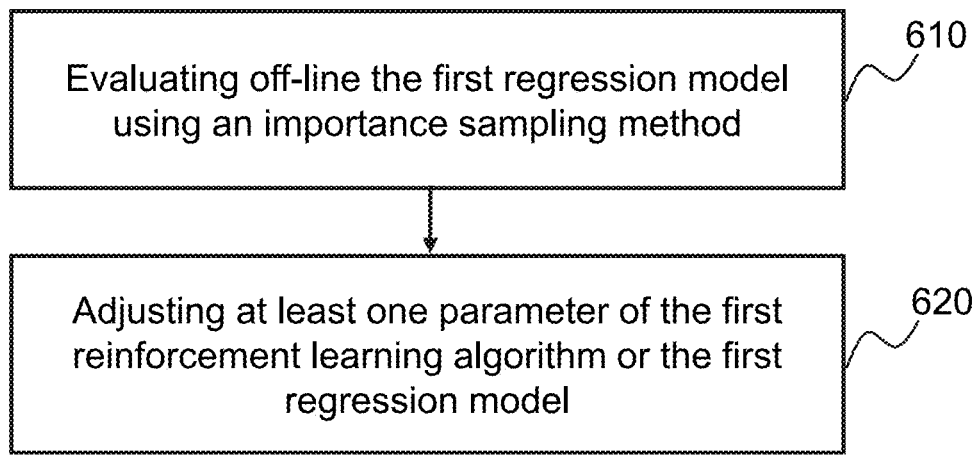
FIG. 6 is a flowchart illustrating an exemplary process and/or method for optimizing a first regression model according to some embodiments of the present disclose.

FIG. 6 is a flowchart of an exemplary process and/or method for optimizing a first regression model according to some embodiments of the present disclose. In some embodiments, one or more steps in the process 600 may be implemented in the system 100 illustrated in FIG. 1. For example, one or more steps in the process 600 may be stored in the storage (e.g., the storage 130, the ROM 230, the RAM 240, etc.) as a form of instructions, and invoked and/or executed by the server 110 (e.g., the processing engine 112 in the server 110, or the processor 220 of the processing engine 112 in the server 110).

In 610, the processor 220 (or the evaluation module 490) may evaluate off-line the first regression model using an importance sampling method.

In some embodiments, the processor 220 may evaluate the first regression model before determining the marketing strategy based on the first regression model. The evaluation of the first regression model may determine whether the first regression model may predict an exact result for the state. In some embodiments, the processor 220 may first sample at least one random strategy to obtain at least one strategy distribution according to the importance sampling method. Then the processor 220 may determine an estimated long-term value corresponding to each strategy distribution, and compare the estimated long-term value to the historical long-term value corresponding to a same strategy distribution. The evaluation may be based on the comparison result. In some embodiments, the processor 220 may evaluate the first regression model according to process and/or method 700 in FIG. 7 in the present disclosure.

FIG. 7 is a flowchart of an exemplary process and/or method for offline evaluating the first regression model according to some embodiments of the present disclose. In some embodiments, one or more steps in the process 700 may be implemented in the system 100 illustrated in FIG. 1. For example, one or more steps in the process 700 may be stored in the storage (e.g., the storage 130, the ROM 230, the RAM 240, etc.) as a form of instructions, and invoked and/or executed by the server 110 (e.g., the processing engine 112 in the server 110, or the processor 220 of the processing engine 112 in the server 110).

In 710, the processor 220 (or the evaluation module 490) may determine at least one random strategy based on a plurality of historical marketing strategies.

In some embodiments, the plurality of historical marketing strategies may refer to a set of test data that has already completed in the history. For example, each historical marketing strategy may include a historical state of a driver, a historical action that the system 100 implement to the driver, and a historical long-term value under the historical state that the driver contributed to the system 100 after being implementing to the historical action. In some embodiments, the historical state may be the same as a state, for example, the registration time of the car and/or the information of the car in the historical state is the same as the registration time of the car and/or the information of the car in a current state. In some embodiments, the historical long-term value may refer to a value of a historical accumulated revenue that the driver brought in for the system 100 in a predetermined period of time in the past (e.g., in the past three days, in the past fifteen days, etc.) after the system 100 implementing the historical strategy to the driver under the historical state. The predetermined period of time may be a preset time value stored in a storage (e.g., the storage 130, the ROM 230, the RAM 240, etc.) of the system 100, or may be determined according to different application scenarios (e.g., different states of drivers, different service types, etc.). In some embodiments, the processor 220 may determine a random strategy corresponding to each historical state in the historical marketing strategies.

In some embodiments, the processor 220 may determine a statistic result of the plurality of historical marketing strategies to obtain the at least one random strategy. For example, in the history, 90% of the marketing strategies under a State 1 is implementing an Action 1 to the driver, and 10% of the marketing strategy is implementing no action. The random strategy corresponding to the State 1 may be same as the statistic result to 90% implement the Action 1 to the driver under the State 1.

In 720, the processor 220 (or the evaluation module 490) may obtain at least one strategy distribution by sampling the at least one random strategy according to the importance sampling method.

In some embodiments, each strategy distribution may correspond to a historical state in the historical marketing strategies. For example, the processor 220 may obtain a plurality of strategy distributions, each corresponds to a historical state in the historical marketing strategies.

In some embodiments, the processor 220 may select the at least one strategy distribution from the at least one random strategy according to the importance sampling method to obtain the at least one strategy distribution. In some embodiments, the strategy distribution may include an optimal strategy distribution. For example, the processor 220 may select one or more optimal strategies that have outstanding performance (e.g., the historical reward corresponding to the strategy is greatest, the historical reward corresponding to the strategy is lowest, etc.) in the history. For example, under the State 1, a Reward 1 corresponding to the Action 1 is the lowest (or greatest) among other actions. The processor 220 may select the strategy of the Action 1 as the strategy distribution under the State 1.

The processor 220 may implement the importance sampling method according to Formula (3):

$$\rho^{\wedge}(\pi_e \mid \tau_i, \pi_i) = \sum_{t=1}^{T} \gamma^{t-1} r_t \prod_{j=1}^{t} \frac{\pi_e(a_j^{\tau_i} \mid s_j^{\tau_i})}{\pi_i(a_j^{\tau_i} \mid s_j^{\tau_i})}, \quad (3)$$

Wherein $\tau_i$ denotes a marketing strategy, $\pi_i$ denotes a random strategy, $\pi_e$ denotes an optimal strategy distribution. In some embodiments, $\pi_e$ may be determined by multiplying $\pi_i$ by a real number. For example, if the reward of implementing an Action 1 in the random strategy is greater than the reward of implementing an Action 2 in the random strategy, $\pi_e$ may be determined by multiplying $\pi_i$ by a real number greater than 1. If the reward of implementing an Action 1 in the random strategy is less than the reward of implementing an Action 2 in the random strategy, $\pi_e$ may be determined by multiplying $\pi_i$ by a real number less than 1.

In 730, the processor 220 (or the evaluation module 490) may determine an estimated long-term value under each historical state that the driver will contribute to the system 100 based on the first regression model.

In some embodiments, the processor 220 may input each historical state in the at least one strategy distribution into the first regression model. The first regression model may predict an estimated long-term value that the driver under each historical state may contribute to the system 100 in the predetermined time period (same as the predetermined time period in the historical marketing strategy) in the further. In some embodiments, the first regression model may traverse every action that the system 100 may implement to the driver under each historical state, and calculate a long-term value under corresponding every action. The estimated long-term value under each historical state may be a greatest value among the long-term values corresponding to different actions.

In 740, the processor 220 (or the evaluation module 490) may determine an evaluation result based on the estimated long-term value and the historical long-term value.

In some embodiments, the processor 220 may compare the evaluated long-term value and the historical long-term value corresponding to a same historical state to obtain the evaluation result. In some embodiments, the evaluation result may be configured to evaluate the performance of the first regression model. For example, if the estimated long-term value under a historical state is higher than the historical long-term value, the processor 220 may evaluate that the first regression model may predict an accurate result. If the estimated long-term value under a historical state is less than the historical long-term value, the processor 220 may evaluate that the first regression model may not predict an accurate result, and the processor 220 may re-train another first regression model to determine a marketing strategy.

In some embodiments, the processor 220 may offline implement one or more steps of the process 700 to evaluate the first regression model. In some embodiments, the processor 220 may online implement one or more steps of the process 700 to evaluate the first regression model.

In some embodiments, the processor 220 may determine the evaluation result based on a plurality of estimated long-term values and a plurality of historical long-term values corresponding to a plurality of historical states. For example, the processor 220 may determine first determine a comparison result corresponding to each historical state by comparing the corresponding estimated long-term value and the corresponding historical long-term value. The processor 220 may then determine a mean value based on the plurality of comparison results. The processor 220 may finally determine the evaluation result based on the mean value. In some embodiments, the mean value may include an average value of the plurality of comparison results, a weight value of the plurality of comparison results, or any value that determined according to a predetermined mathematical method, or the like, or any combination thereof. For example, the mean value may be determined by assigning different weights to different historical states.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 700. As another example, all the steps in the exemplary process/method 700 may be implemented in a computer-readable medium including a set of instructions. The instructions may be transmitted in a form of electronic current or electrical signals.

Referring back to FIG. 6, in 620, the processor 220 (or the feedback module 411) may adjust the at least one parameter of the first reinforcement learning algorithm or the first regression model.

In some embodiments, the adjustment of the at least one parameter may be configured to optimize the learning and training process, and to make the predict result more accurate. In some embodiments, the at least one parameter of the first reinforcement learning algorithm may include any parameter in determining the first value function. For example, the at least one parameter may include a weight coefficient in the Q-learning iteration Formula (1), a discount coefficient in the Q-learning iteration Formula (1), a weight coefficient in the Sarsa-learning iteration Formula (2), a discount coefficient in the Sarsa-learning iteration Formula (2), or the like, or any combination thereof.

In some embodiments, the at least one parameter of the first regression model may include any parameter in training the initial model to obtain the first regression model. For example, the at least one parameter in training a XG boost model for obtaining the first regression model may include a general parameter, a booster parameter, a learning task parameters, or the like, or any combination thereof.

In some embodiments, the processor 220 may adjust the at least one parameter of the first reinforcement learning algorithm or the first regression model based on the evaluation result obtained in 610 of the process 600. For example, the processor 220 may adjust the weight coefficient based on the comparison result obtain in 740 in the process 700 in the present disclosure. As another example, the processor 220 may adjust the at least one parameter of the first reinforcement learning algorithm or the first regression model according to a predetermined rule. The predetermined rule may be predetermined by the system 100 based on the offline evaluation result.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 600. As another example, all the steps in the exemplary process/method 600 may be implemented in a computer-readable medium including a set of instructions. The instructions may be transmitted in a form of electronic current or electrical signals.

Figure 8:
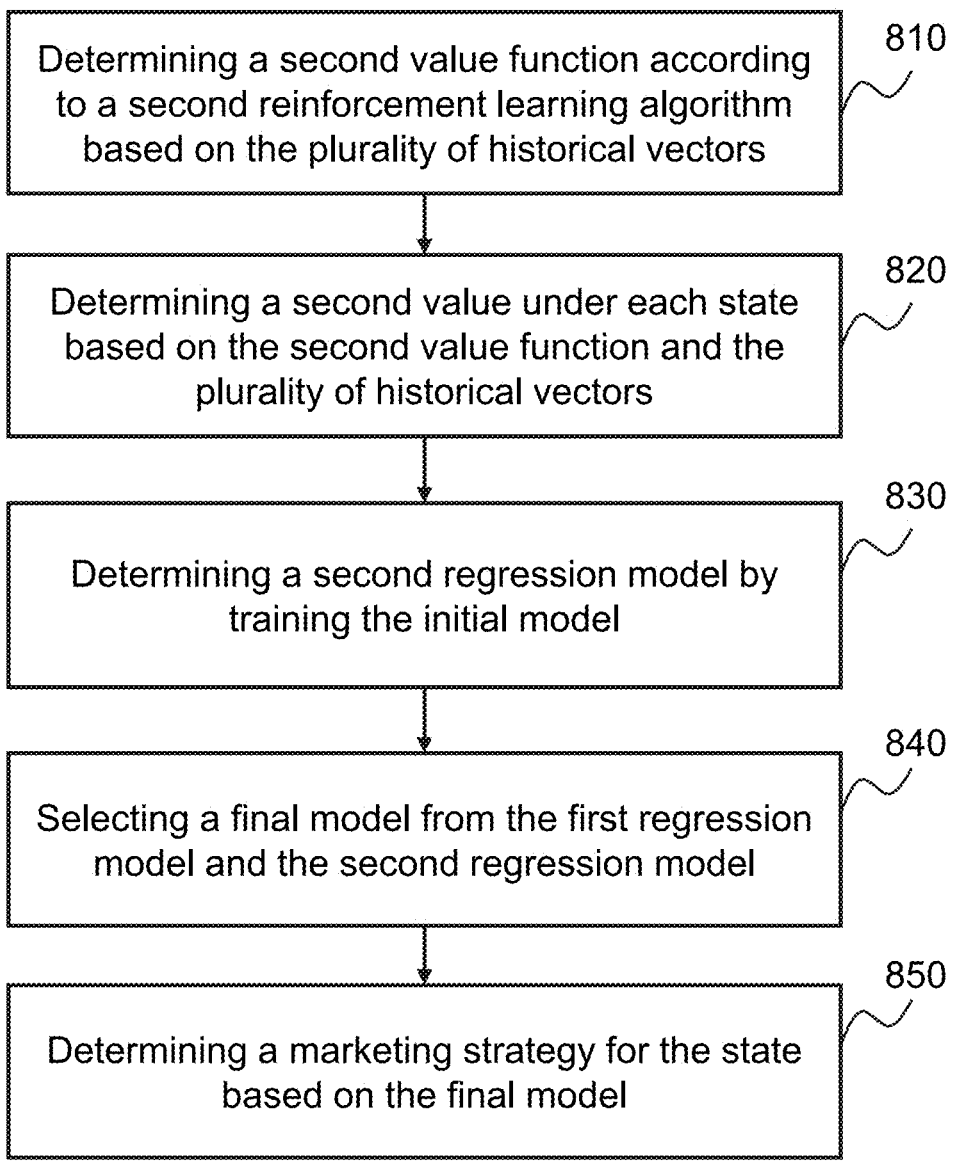
FIG. 8 is a flowchart illustrating an exemplary process and/or method for determining a marketing strategy for an online to offline service according to some embodiments of the present disclose.

FIG. 8 is a flowchart of an exemplary process and/or method for determining a marketing strategy for an online to offline service according to some embodiments of the present disclose. In some embodiments, one or more steps in the process 800 may be implemented in the system 100 illustrated in FIG. 1. For example, one or more steps in the process 800 may be stored in the storage (e.g., the storage 130, the ROM 230, the RAM 240, etc.) as a form of instructions, and invoked and/or executed by the server 110 (e.g., the processing engine 112 in the server 110, or the processor 220 of the processing engine 112 in the server 110).

In some embodiments, the processor 220 may determine more than one regression model (e.g., two regression models, five regression models, etc.) to determine the marketing strategy for the online to offline service. For example, the processor 220 may compare the more than one regression model to determine a final model with good performance to determine the marketing strategy. As another example, the processor 220 may determine a regression model for each state, and use the corresponding regression model to determine the marketing strategy for the driver under the state. For illustration purpose, two regression models to be described herein to determine the marketing strategy in connection with FIG. 5 and FIG. 8. For example, the processor 220 may implement one or more steps in the process 800 of FIG. 8 after the process 500 of FIG. 5 in the present disclosure. As another example, the processor 220 may implement one or more steps in the process 500 and/or the process 800 to determine the marketing strategy.

In 810, the processor 220 (or the second value function module 450) may determine a second value function according to a second reinforcement learning algorithm based on the plurality of historical vectors.

In some embodiments, the second value function may refer to a function that represents an expectation value of an accumulated revenue that a driver may bring in for the system 100 in the future. In some embodiments, the second value function may include an algorithm, a formula, a method, a process, or the like, for determining the expectation value of an accumulated revenue that a driver may bring in for the system 100. In some embodiments, the processor 220 may off-line determine the second value function according to the second reinforcement learning algorithm. In some embodiments, the processor 220 may also on-line determine the second value function.

In some embodiments, the second reinforcement learning algorithm may include a temporal-difference (TD) learning algorithm, a dynamic programming algorithm, a Monte Carlo (MC) learning algorithm, a Q-learning algorithm, a Sarsa-learning algorithm, a deep Q network algorithm, a deep deterministic policy gradient (DDPG) algorithm, or the like, or any combination thereof. In some embodiments, the processor 220 may determine the second value function according to the second reinforcement learning algorithm using a toolkit. For example, the second value function may be determined by a Spark Mllib, a MLbox, a MR, or the like, or any combination thereof.

In some embodiments, the process of determining the second value function according to the second reinforcement learning algorithm based on the plurality of historical vectors may be same as the process of determining the first value function in the present disclosure (e.g., step 520 of FIG. 5 and the description thereof).

It should be noted that the second reinforcement learning algorithm may be different from the first reinforcement learning algorithm. For example, the first reinforcement learning algorithm may be a Q-learning algorithm, and the second learning algorithm may be a Sarsa-learning algorithm. As another example, the first reinforcement learning algorithm may be a deep Q-learning algorithm, and the second learning algorithm may be a TD learning algorithm. More descriptions of the Q-learning algorithm and/or the Sarsa-learning algorithm may be found elsewhere in the present disclosure (e.g., FIG. 5 and the description thereof).

In 820, the processor 220 (or the second value module 460) may determine a second value under a state of a driver to provide the online to offline service based on the second value function and the plurality of historical vectors.

In some embodiments, the second value may refer to an expectation value of an accumulated revenue that the driver may bring in for the system 100 in the future (e.g., in a predetermined time period in the future). In some embodiments, the processor 220 may traverse each state in the plurality of historical vectors to determine the corresponding second value under each state by inputting the plurality of historical vectors into the first value function.

In 830, the processor 220 (or the second regression model module 470) may obtain a second regression model by training the initial model.

In some embodiments, the process of training the initial model to obtain the second regression model may be same as the process of training the initial model to obtain the first regression model in the present disclosure (e.g., step 540 of FIG. 5 and the description thereof).

In some embodiments, more descriptions of the initial model may be found elsewhere in the present disclosure (e.g., FIG. 5 and the description thereof). In some embodiments, the initial model trained to obtain the second regression model may be same as the initial model trained to obtain the first regression model. For example, the two initial models may be a same XG boost model. In some embodiments, the two initial models may be different from each other. For example, the initial model trained to obtain the first regression model may be a XG boost model, and the initial model trained to obtain the second regression model may be a Ada boost model.

In 840, the processor 220 (or the final model module 480) may select a final model from the first regression model and the second regression model.

In some embodiments, the processor 220 may evaluate the first regression model and the second regression model, and select one of the models with a better performance as the final model. For example, the processor 220 may evaluate the first regression model and/or the second regression model based on a plurality of historical strategy data. More descriptions of evaluation of the first regression model and/or the second regression model may be found elsewhere in the present disclosure (e.g., FIG. 6 and/or FIG. 7 and the descriptions thereof). In some embodiments, more descriptions of selecting the final model from the first regression model and the second regression model may be found elsewhere in the present disclosure (e.g., FIG. 9 and the description thereof).

In some embodiments, the processor 220 may select one final model for all states of drivers. For example, the processor 220 may use the historical strategy data of all states to evaluate the first regression model and the second regression model, and select only one final model for the all the states to determine marketing strategy for the drivers. In some embodiments, the processor 220 may select one final model for each state of drivers. For example, the processor 220 may use the historical strategy data associated with a State 3 to evaluate the first regression model and the second regression model, and select a Final Model 1 for the State 3 to determine marketing strategy for the driver under the State 3. And the processor 220 may use the historical strategy data associated with a State 4 to evaluate the first regression model and the second regression model, and select a Final Model 2 for the State 4 to determine marketing strategy for the driver under the State 4.

In 850, the processor 220 (or the marketing strategy module 413) may determine a marketing strategy for the state based on the final model.

In some embodiments, the processor 220 may input the state into the final model. The final model may traverse every action that the system 100 may implement to the driver under the state, and calculate a long-term value under corresponding every action. The output of the final model may be an optimal action that has a greatest long-term value under the state.

In some embodiments, the processor 220 may generate the marketing strategy for the state based on the optimal action that has a greatest long-term value under the state. For example, for a driver under the state of registering on the system 100 for 30 days, the processor 220 may input the state into the first regression model to determine the optimal action (e.g., sending a short message) under the state. The processor 220 may then generate a marketing strategy for sending a short message to the driver under the state.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 800. As another example, all the steps in the exemplary process/method 800 may be implemented in a computer-readable medium including a set of instructions. The instructions may be transmitted in a form of electronic current or electrical signals.

Figure 9:
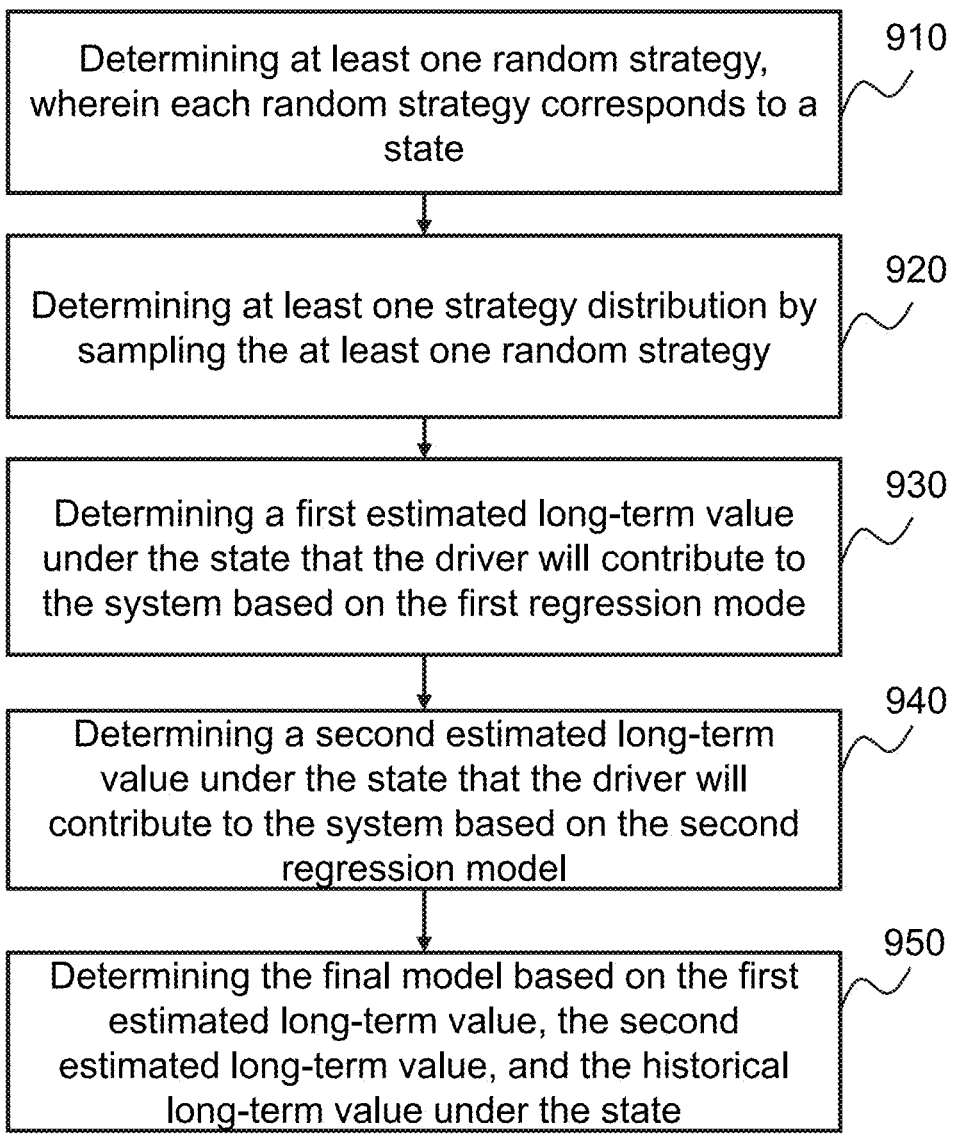
FIG. 9 is a flowchart illustrating an exemplary process and/or method for determining a final model according to some embodiments of the present disclose.

FIG. 9 is a flowchart of an exemplary process and/or method for determining a final model according to some embodiments of the present disclose. In some embodiments, one or more steps in the process 900 may be implemented in the system 100 illustrated in FIG. 1. For example, one or more steps in the process 900 may be stored in the storage (e.g., the storage 130, the ROM 230, the RAM 240, etc.) as a form of instructions, and invoked and/or executed by the server 110 (e.g., the processing engine 112 in the server 110, or the processor 220 of the processing engine 112 in the server 110).

In 910, the processor 220 (or the evaluation module 490) may determine at least one random strategy, wherein each random strategy corresponds to a state. In some embodiments, the process of determining the at least one random strategy may be found elsewhere in the present disclosure (e.g., step 710 of FIG. 7 and the description thereof).

In 920, the processor 220 (or the evaluation module 490) may obtain at least one strategy distribution by sampling the at least one random strategy according to the importance sampling method. In some embodiments, the process of obtaining the at least one strategy distribution may be found elsewhere in the present disclosure (e.g., step 720 of FIG. 7 and the description thereof).

In 930, the processor 220 (or the evaluation module 490) may determine a first estimated long-term value under each historical state that the driver will contribute to the system 100 based on the first regression model. In some embodiments, the process of determining the first estimated long-term value may be same as the process of determining an estimated long-term value described elsewhere in the present disclosure (e.g., step 730 of FIG. 7 and the description thereof).

In 940, the processor 220 (or the evaluation module 490) may determine a second estimated long-term value under each historical state that the driver will contribute to the system 100 based on the second regression model. In some embodiments, the process of determining the first estimated long-term value may be same as the process of determining an estimated long-term value described elsewhere in the present disclosure (e.g., step 730 of FIG. 7 and the description thereof).

In 950, the processor 220 (or the final module 480) may determine the final model based on the first estimated long-term value, the second estimated long-term value, and the historical long-term value under the historical state.

In some embodiments, the processor 220 may compare the first estimated long-term value, the second estimated long-term value, and/or the historical long-term value under a same historical state. The processor 220 may determine final model based on the comparison result. For example, the processor 220 may first compare the first estimated long-term value and/or the second estimated long-term value to the historical long-term value. If the first estimated long-term value and the second estimated long-term value are both greater than the historical long-term value, the processor may further compare the first estimated long-term value and the second estimated long-term value. The processor 220 may select the regression model corresponding to a greater value between the first estimated long-term value and the second estimated long-term value as the final model. As another example, if the first estimated long-term value and the second estimated long-term value are both less than the historical long-term value, the processor 220 may re-train another model to determine a marketing strategy. As still another example, if one of the first estimated long-term value and the second estimated long-term value is greater than the historical long-term value, and the other is less than the historical long-term value, the processor 220 may select the regression model corresponding to the greater estimated long-term value as the final model.

In some embodiments, the processor 220 may offline implement one or more steps of the process 900 to determine the final model. In some embodiments, the processor 220 may online implement one or more steps of the process 900 to determine the final model.

In some embodiments, the processor 220 may determine the final model based on a plurality of estimated long-term values and a plurality of historical long-term values corresponding to a plurality of historical states. For example, the processor 220 may determine first determine a comparison result corresponding to each historical state by comparing the corresponding first and second estimated long-term values and the corresponding historical long-term value. The processor 220 may then determine a mean value based on the plurality of comparison results for the first and the second estimated long-term values, respectively. The processor 220 may finally determine the final model based on the mean values. In some embodiments, each mean value may include an average value of the plurality of comparison results, a weight value of the plurality of comparison results, or any value that determined according to a predetermined mathematical method, or the like, or any combination thereof. For example, the mean value may be determined by assigning different weights to different historical states.

In some embodiments, the processor 220 (or the feedback module 411) may adjust the at least one parameter of the final model. For example, the processor 220 may adjust the at least one parameter of the final model based on the first estimated long-term value, the second estimated long-term value, and the historical long-term value under the historical state. In some embodiments, the processor 220 (or the feedback module 411) may adjust the at least one parameter of first reinforcement learning algorithm and/or the second reinforcement learning algorithm based on the first estimated long-term value, the second estimated long-term value, and the historical long-term value under the historical state. In some embodiments, more descriptions of adjusting a parameter may be found elsewhere in the present disclosure (e.g., FIG. 6 and the description thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 900. As another example, all the steps in the exemplary process/method 900 may be implemented in a computer-readable medium including a set of instructions. The instructions may be transmitted in a form of electronic current or electrical signals.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system for determining a marketing strategy for an online to offline service, comprising:
   at least one computer-readable storage medium for storing a set of instructions in determining the marketing strategy for the online to offline service; and
   at least one processor in communication with the computer-readable storage medium, wherein when executing the set of instructions, the at least one processor is directed to:
      obtain a plurality of historical vectors, each of the plurality of historical vectors being associated with a state of a driver and collected from a driver terminal via a network;
      determine a first value function according to a first reinforcement learning algorithm based on the plurality of historical vectors;
      determine a first value under a state of a driver to provide the online to offline service based on the first value function and the state;
      obtain a first regression model according to a machine learning algorithm by training an initial model, wherein the plurality of historical vectors are inputs of the initial model, and the first value under the state is a label of the initial model;
      determine a second value function according to a second reinforcement learning algorithm based on the plurality of historical vectors;
      determine a second value under each state based on the second value function and the state;
      determine a second regression model by training the initial model, wherein the plurality of historical vectors are the inputs of the initial model, the second value under each state is a label of the initial model;
      select a final model from the first regression model and the second regression model; and
      utilize the final model to determine the marketing strategy for the online to offline service.

2. The system of claim 1, wherein each of the plurality of historical vectors includes the state of the driver, at least one historical action that the system implemented to the driver under the state, and a historical reward under the state and the at least one historical action.

3. The system of claim 1, wherein the at least one processor is further directed to:
   evaluate off-line the first regression model using an importance sampling method; and thereby,
   adjust at least one parameter of the first reinforcement learning algorithm or the first regression model.

4. The system of claim 3, the at least one processor is further directed to:
   determine at least one random strategy based on a plurality of historical marketing strategies, wherein each historical marketing strategy includes a historical state of a driver, a historical action that the system implemented to the driver, and a historical long-term value under the state that the driver contributed to the system after being implemented to the historical action;
   obtain at least one strategy distribution by sampling the at least one random strategy according to the importance sampling method;
   determine an estimated long-term value under each historical state that the driver will contribute to the system based on the first regression model; and
   determine an evaluation result based on the estimated long-term value and the historical long-term value.

5. The system of claim 2, wherein the state of the driver comprises statistical information associated with the driver in the system or a demographic attribute of the driver.

6. The system of claim 5, wherein the statistical information comprises a registration time of the car, information of the car, or a lapse between the registration time and a first online to offline service provided by the car, and wherein the demographic attribute of the driver comprises age, sex, a cultural background, and a job, and any combination thereof.

7. The system of claim 2, wherein the at least one historical action comprises at least one of: a short message, a coupon, an action time the system sent to the driver, or a sequence of a plurality of the at least one historical actions.

8. The system of claim 2, wherein the historical reward comprises a Gross Merchandise Volume that the driver contributed to the system.

9. The system of claim 4, wherein the at least one strategy distribution comprises an optimal strategy distribution.

10. The system of claim 1, wherein the first reinforcement learning algorithm includes a Q-learning algorithm, and the inputs of the Q-learning algorithm are the plurality of historical vectors, and the output of the Q-learning algorithm is the first value function.

11. The system of claim 1, wherein the first reinforcement learning algorithm includes a Sarsa-learning algorithm, and the inputs of the Sarsa-learning algorithm are the plurality of historical vectors, and the output of the Sarsa-learning algorithm is the first value function.

12. The system of claim 1, wherein the initial model is a XG Boost model.

13. The system of claim 1, wherein to obtain the plurality of historical vectors, the at least one processor is further directed to:
obtain a plurality of historical vectors based on a Markov Decision Process (MDP) model, wherein the input of the MDP model is historical marketing data.

14. The system of claim 1, wherein to determine the final model, the at least one processor is further directed to:
determine at least one random strategy;
obtain at least one strategy distribution by sampling the at least one random strategy;
determine a first estimated long-term value under the state that the driver will contribute to the system based on the first regression model;
determine a second estimated long-term value under the state that the driver will contribute to the system based on the second regression model; and
determine the final model based on the first estimated long-term value, the second estimated long-term value, and the historical long-term value under the state.

15. The system of claim 14, wherein the at least one processor is further directed to:
adjust at least one parameter of the first reinforcement learning algorithm or the second reinforcement learning algorithm based on the first estimated long-term value, the second estimated long-term value, and the historical long-term value under the state.

16. A method for determining a marketing strategy for an online to offline service implemented on a computing device having at least one processor, at least one computer-readable storage medium, and a communication platform connected to a network, comprising:
obtaining a plurality of historical vectors, each of the plurality of historical vectors being associated with a state of a driver and collected from a driver terminal via a network;
determining a first value function according to a first reinforcement learning algorithm based on the plurality of historical vectors;
determining a first value under a state of a driver to provide the online to offline service based on the first value function and the state;
obtaining a first regression model according to a machine learning algorithm by training an initial model, wherein the plurality of historical vectors are inputs of the initial model, and the first value under the state is a label of the initial model;
determining a second value function according to a second reinforcement learning algorithm based on the plurality of historical vectors;
determining a second value under each state based on the second value function and the state;
determining a second regression model by training the initial model, wherein the plurality of historical vectors are the inputs of the initial model, the second value under each state is a label of the initial model;
selecting a final model from the first regression model and the second regression model; and
utilize the final model to determine the marketing strategy for the online to offline service.

17. The method of claim 16, wherein each of the plurality of historical vectors includes the state of the driver, at least one historical action that the system implemented to the driver under the state, and a historical reward under the state and the at least one historical action.

18. The method of claim 16 further comprising:
evaluating off-line the first regression model using an importance sampling method; and thereby,
adjusting at least one parameter of the first reinforcement learning algorithm or the first regression model.

19. The method of claim 18 further comprising:
determining at least one random strategy based on a plurality of historical marketing strategies, wherein each historical marketing strategy includes a historical state of a driver, a historical action that the system implemented to the driver, and a historical long-term value under the state that the driver contributed to the system after being implemented to the historical action;
obtaining at least one strategy distribution by sampling the at least one random strategy according to the importance sampling method;
determining an estimated long-term value under each historical state that the driver will contribute to the system based on the first regression model; and
determining an evaluation result based on the estimated long-term value and the historical long-term value.

* * * * *